United States Patent
Feldman et al.

(10) Patent No.: US 12,001,401 B2
(45) Date of Patent: Jun. 4, 2024

(54) ENHANCED CO-AUTHORING AND FILE SYNCING

(71) Applicant: Microsoft Technology Licensing, LLC, Redmond, WA (US)

(72) Inventors: Boris Isaac Feldman, Seattle, WA (US); Matthew James Ruhlen, Redmond, WA (US); Manish Soni, Las Vegas, NV (US); Marcus Eduardo Markiewicz, Teaneck, NJ (US); Michal Krzysztof Piaseczny, Bellevue, WA (US); Nisha Tekchand Singh, Redmond, WA (US); Bowen Xue, Kirkland, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 120 days.

(21) Appl. No.: 17/511,982

(22) Filed: Oct. 27, 2021

(65) Prior Publication Data
US 2023/0125637 A1 Apr. 27, 2023

(51) Int. Cl.
*G06F 16/00* (2019.01)
*G06F 16/13* (2019.01)
*G06F 16/178* (2019.01)

(52) U.S. Cl.
CPC .......... *G06F 16/178* (2019.01); *G06F 16/137* (2019.01)

(58) Field of Classification Search
CPC .............................. G06F 16/178; G06F 16/137
See application file for complete search history.

(56) References Cited

U.S. PATENT DOCUMENTS

| 10,394,689 | B1* | 8/2019 | Ledet | H04L 67/34 |
| 2017/0270136 | A1* | 9/2017 | Chen | G06F 16/178 |
| 2020/0250201 | A1 | 8/2020 | Cantwell et al. | |

OTHER PUBLICATIONS

"International Search Report and Written Opinion Issued in PCT Patent Application No. PCT/US22/039649", dated Oct. 21, 2022, 13 Pages.
"CheckFileInfo", Retrieved from: https://wopi.readthedocs.io/projects/wopirest/en/latest/files/CheckFileInfo.html#term-sharingstatus, Retrieved on: Jul. 22, 2021, 20 pages.
"Creating new files using Office for the web", Retrieved from: https://wopi.readthedocs.io/en/latest/scenarios/createnew.html#create-new, Retrieved on: Jul. 22, 2021, 1 Page.

(Continued)

*Primary Examiner* — Tyler J Torgrimson

(57) ABSTRACT

In an implementation, a sync engine running on a computing device synchronizes a local copy of a file with a copy of the file hosted by an online file service. An application on the device receives a request/command to open the file and responsively opens a temporary copy of the file in memory. The application populates the temporary file with content from the local copy of the file and also establishes a connection between the application and a co-authoring service. Note that the connection between the application and the co-authoring session bypasses the sync engine such, when connected to the co-authoring service, the application is able to synchronize the content in the temporary copy of the file with content in the hosted copy of the file over the connection.

20 Claims, 13 Drawing Sheets

(56) References Cited

OTHER PUBLICATIONS

"GetNewAccessToken", Retrieved from: https://wopi.readthedocs.io/projects/wopirest/en/latest/bootstrapper/GetNewAccessToken.html?highlight=getnewaccesstoken, Retrieved on: Jul. 22, 2021, 2 Pages.

"Integrating with Office for the web", Retrieved from: https://wopi.readthedocs.io/en/latest/overview.html, Retrieved on: Jul. 22, 2021, 4 Pages.

"Key concepts", Retrieved from: https://wopi.readthedocs.io/projects/wopirest/en/latest/concepts.html?highlight=ttl#term-access-token-ttl, Retrieved on: Jul. 22, 2021, 6 pages.

"Lock", Retrieved from: https://wopi.readthedocs.io/projects/wopirest/en/latest/files/Lock.html, Retrieved on: Jul. 22, 2021, 2 Pages.

"RefreshLock", Retrieved from: https://wopi.readthedocs.io/projects/wopirest/en/latest/files/RefreshLock.html, Retrieved on: Jul. 22, 2021, 2 Pages.

"RenameFile", Retrieved from: https://wopi.readthedocs.io/projects/wopirest/en/latest/files/RenameFile.html, Retrieved on: Jul. 22, 2021, 3 Pages.

"SpookyHash: a 128-bit noncryptographic hash", Retrieved from: https://burtleburtle.net/bob/hash/spooky.html, Retrieved on: Jul. 22, 2021, 2 Pages.

"Standard WOPI request and response headers", Retrieved from: https://wopi.readthedocs.io/projects/wopirest/en/latest/common_headers.html, Retrieved on: Jul. 22, 2021, 3 Pages.

"UnlockAndRelock", Retrieved from: https://wopi.readthedocs.io/projects/wopirest/en/latest/files/UnlockAndRelock.html, Retrieved on: Jul. 22, 2021, 3 Pages.

"Verifying that requests originate from Office for the web by using proof keys", Retrieved from: https://wopi.readthedocs.io/en/latest/scenarios/proofkeys.html, Retrieved on: Jul. 22, 2021, 8 Pages.

"ZIP File Format Specification", Retrieved from: https://pkware.cachefly.net/webdocs/casestudies/APPNOTE.TXT, Jul. 15, 2020, 55 Pages.

Crockford, Douglas, "The Application/Json Media Type for JavaScript Object Notation (JSON)", Published by RFC Editor, Jul. 2006, 10 Pages.

"Using the WOPI protocol to integrate with Office for the web", Retrieved from: https://web.archive.org/web/20210611083854/https://wopi.readthedocs.io/en/latest/, Jun. 11, 2021, 2 Pages.

* cited by examiner

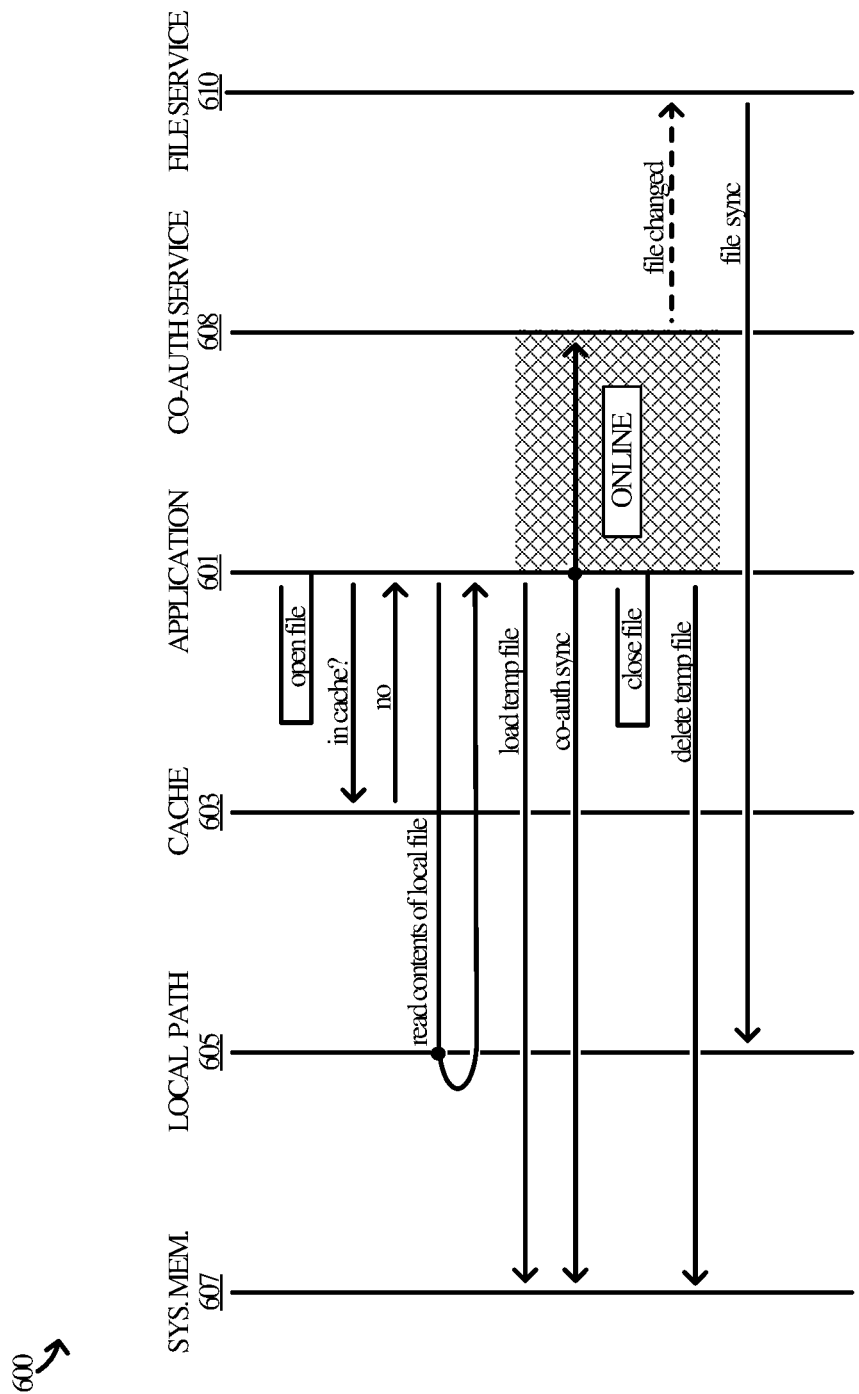

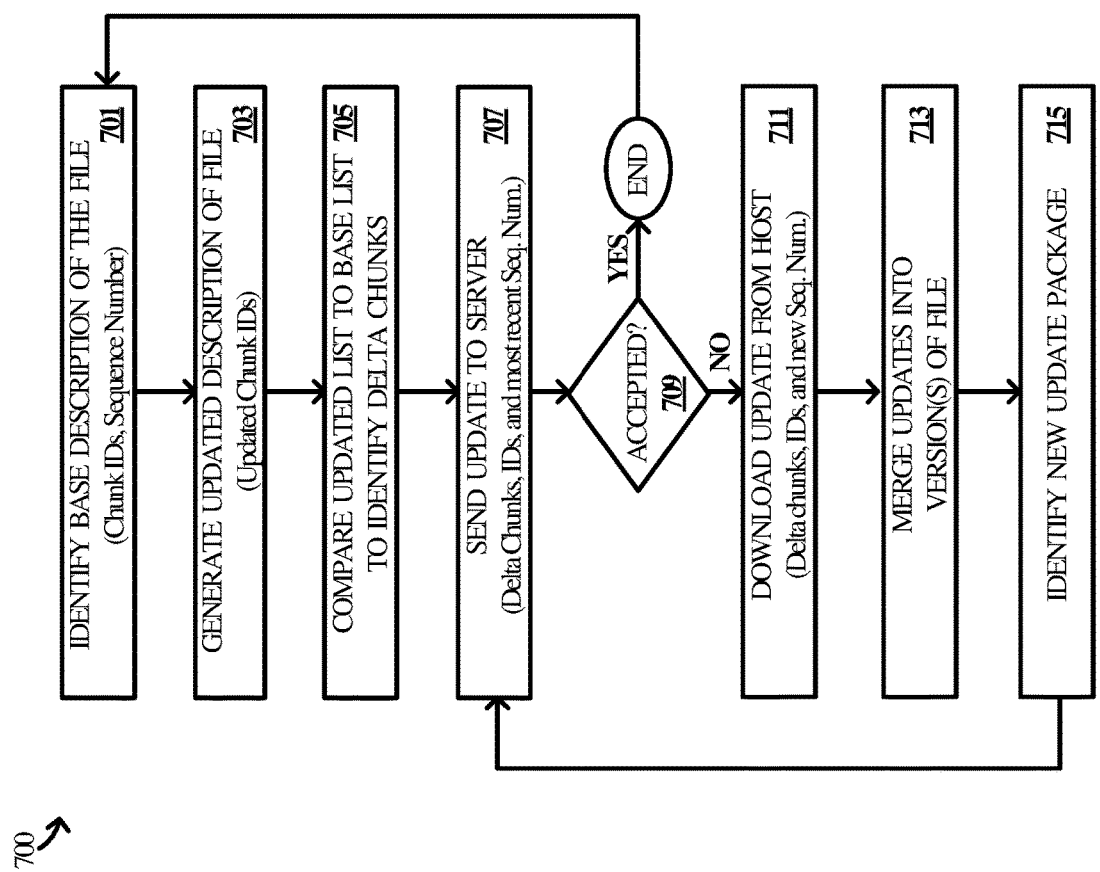

ENHANCED CO-AUTHORING AND FILE SYNCING

TECHNICAL FIELD

Aspects of the disclosure are related to the field of software applications and services and, more particularly, to enhanced co-authoring and file syncing.

BACKGROUND

Co-authoring is a central feature of many software applications and services that allows multiple users to work together on word processing documents, spreadsheets, presentations, notebooks, and the like, all of which are referred to herein as files, electronic documents, or just documents. In many implementations, each user can view and edit a given document at the same time as other users edit the same document, and every user can see in near real-time the changes being made to the document by the others.

In a typical scenario, a group of users share a document that is stored by an online file service and that is accessible via their web browsers. Clicking on or otherwise selecting a uniform resource locator (URL) causes the document's contents to be loaded by a web application in the browser. The application recognizes that the document is shared and coordinates with a co-authoring service to ensure that edits made to the content by the user are synchronized with others edits made by the other users in the group. The document file itself remains anchored with the file service and only the co-authoring service can persist changes to it.

A drawback to this arrangement is its inability to support co-authoring from other application contexts (e.g., outside of the browser) and with respect to locally synced files. For example, a shared file may reside in an online folder that is synchronized locally to each user's computer by a sync engine. The local copies of the file are thus accessible to applications via local paths on their respective computers such that a user can open and edit a file copy using a native application (or any type of application, for that matter). This provides a substantial benefit since it allows users to work on files while offline and/or disconnected from the cloud.

Unfortunately, once the file is closed, the sync engine uploads the changed file to the cloud, which can result in numerous conflict copies proliferating in the cloud when multiple users edit their respective copies of the same file at overlapping times. The resulting confusion is both a drain on productivity and a waste of time, energy, and other computing resources.

Overview

Technology is disclosed herein that allows locally synced files to be edited in the context of co-authoring environments, regardless of the nature of the application opening a given file. In an implementation, a sync engine running on a computing device synchronizes a local copy of a file with a copy of the file hosted by an online file service. An application on the device receives a request/command to open the file and responsively opens a temporary copy of the file in memory. The application populates the temporary file with content from the local copy of the file and also establishes a connection between the application and a co-authoring service. Note that the connection between the application and the co-authoring session bypasses the sync engine such that, when connected to the co-authoring service, the application is able to synchronize the content in the temporary copy of the file with content in the hosted copy of the file over the connection. Moreover, the application does not sync the temporary copy of the file with the local copy of the file. Rather, the local copy of the file is updated by the sync engine, as it normally would be, meaning that the local copy is synchronized with the hosted copy of the file in the cloud.

When the temporary file is closed while the application remains connected to the co-authoring service, the application can delete the temporary file since any changes will have been uploaded to the service. Then, since the cloud/hosted copy of the file will have changed, the sync engine on the computing device will download the new version of the file from the file service. If the file is closed while the application is offline, the application stores the file in its cache and attempts to upload its changes the next time it is online.

In some implementations, the application utilizes an efficient syncing protocol when synchronizing document content between the temporary copy of the file and the hosted copy of the file. The application maintains a base state of the temporary file that includes a sequence number most recently provided by the co-authoring service to the application. The base state also includes a base list of chunk identifiers produced by hashing the temporary copy of the file on a per-chunk basis.

After an amount of time during which one or more changes were made to the temporary copy of the file, the application determines an updated state of the temporary copy of the file. The updated state includes an updated list of chunk identifiers produced by re-hashing the temporary copy of the file, also on a per-chunk basis.

The application then identifies one or more delta chunks by comparing the base list of chunk identifiers to the updated list of chunk identifiers to determine which chunks of the temporary copy of the file were altered by the one or more changes. The application sends an update to the co-authoring service that includes the updated list of chunk identifiers, the one or more delta chunks, and the sequence number. The co-authoring service receives the update and determines whether the sequence number matches its current sequence number for the hosted copy of the file. Assuming so, the service updates the hosted file with the delta chunks provided with the update.

If the sequence numbers do not match, then the co-authoring service rejects the update. The application instead obtains an update from the service in order to bring its copy of the file up-to-date. The update provided by the service includes a new sequence number and any delta chunks that may be needed to make the temporary file current, as well as their corresponding chunk identifiers produced by hashing the chunks. On the client side, the application produces a new state that reflects both the changes from the service and the changes that were made locally in the temporary file. The application can attempt again to update the service but with a new set of delta chunks and the new sequence number. Assuming the sequence numbers match this time, the hosted copy of the file will be brought in-sync with the new state of the file maintained by the application.

In some implementations, the application is a locally installed application that runs natively on the computing device. In other implementations, the application is a web application that runs in the context of a web browser on the computing device. In such scenarios, the web application does not populate a temporary file with content from the local file, but rather opens the file from wherever it resides, whether that be locally or remote. The web application may perform an immediate synchronization with the hosted copy of the file, which includes obtaining the current sequence number from the co-authoring service. The web application can then proceed with the synchronization protocol as described above.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modification's, and equivalents.

FIGS. 6A-6C illustrates still another operational scenario in an implementation.

FIG. 7 illustrates a syncing process in an implementation.

DETAILED DESCRIPTION

Figure 1:
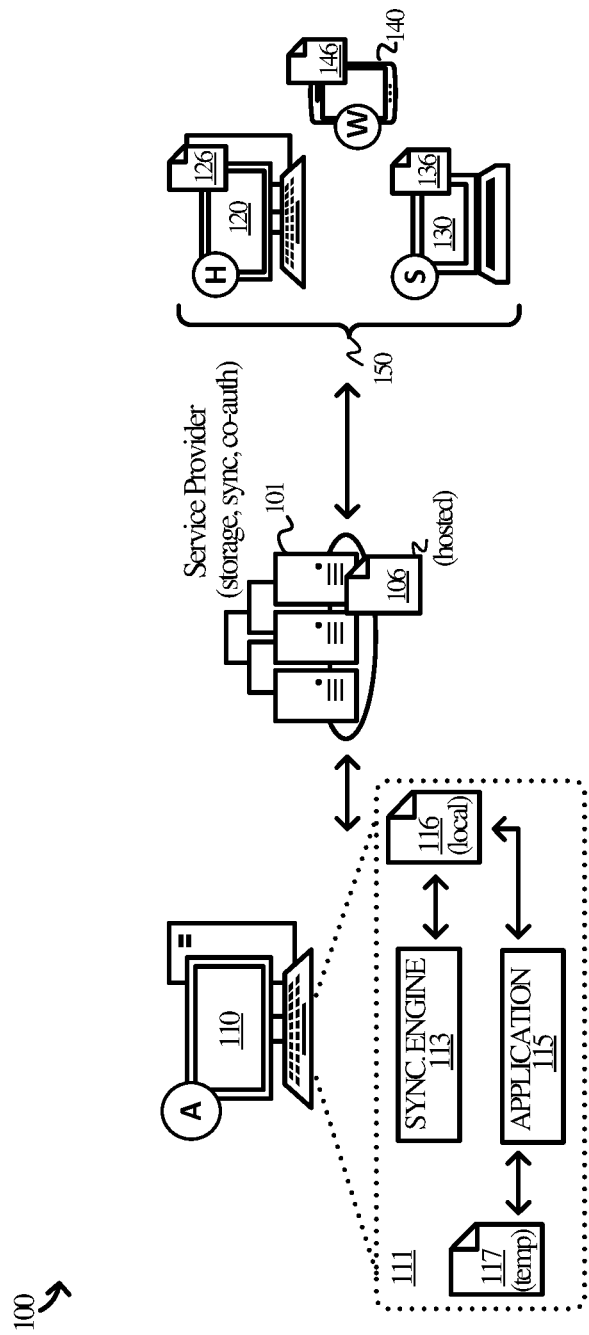
FIG. 1 illustrates a co-authoring environment in an implementation.

Technology is disclosed herein that supports the integration of co-authoring features and functionality with that of file storage and syncing services. In the past, when a user desired to edit a local file on computing device, the user would open the file using a suitable application and would proceed to edit the file. As the edits were saved (and especially upon closing the file), a sync engine on the computer would upload the changed file to the cloud to replace the contents of a hosted copy of the file, so that the two versions would be in-sync. However, one or more other users may also desire to edit their local copies of the same file at the same time. As the local files are all different versions of the same file in the cloud, their edits would cause their respective sync engines to upload their own changed files to the service provider.

Depending upon the timing of the sync operations, several problems could occur. For example, the sync operations could cause collisions that the service provider would resolve by creating multiple conflict copies of hosted file. In another example, file could be repeatedly overwritten (replaced) by the most recent version of the file to be uploaded to the service.

Various technical advances and effects are disclosed herein that allow co-authoring channels to be established between local versions of a hosted file. The cloud copy of the file can still be synced with local instantiations of the file as before, but their content can also be edited simultaneously by multiple users without causing the conflicts and collisions described above. This advance is accomplished by establishing a co-authoring session between temporary copies of the local files with the hosted version of the file in the cloud. Users can edit their respective temporary copy of the file and their edits can be synced with the hosted copy of the file, without having to persist any changes in the temporary copy of the file to the local copy of the file. Rather, the hosted copy of the file can be synced back down to the local copies of the file via their normal background sync processes.

Other technical aspects are also contemplated herein, such as the ability for users to work offline while ensuring that their changes are saved locally and are eventually uploaded to the co-authoring service that manages the co-authoring sessions. A user may go offline either from the start or in the middle of editing a document. Regardless, the user's changes are saved to a document cache. The next time the local document is to be opened, content is drawn from the file in the document cache instead and immediately synced with the co-authoring service.

Another advance relates to how the files are synced in the context of co-authoring sessions. A chunking mechanism is employed wherein a temporary copy of a file is divided into logical chunks. Each chunk is then passed through a hash function to produce a hash value, which forms at least part of a chunk identifier (ID) for that chunk. A base state of the temporary file may thus be established that includes a list of chunk identifiers, as well as the most recent sequence number provided to the application by the co-authoring service. As changes are made locally in the temporary file, an updated state is produced by re-hashing the chunks and comparing the updated list of identifiers to the base list. The differences in the updated list indicate that corresponding ones of the chunks have changed.

The application sends the delta chunks (those that changed between the base state and the updated state) to the co-authoring service, along with the most recent sequence number provided to the application by the co-authoring service. The application also includes the updated list of chunk identifiers.

The co-authoring service first checks whether the application was working with the most recent version of the file by comparing the sequence number provided in the update with the current sequence number maintained by the service. (The sequence number may have been increased if, for example, other updates from other users caused the hosted file to change.) Assuming the sequence numbers match, the co-authoring service updates the hosted file with the changes included in the delta chunks.

In the case where the sequence numbers do not match, the co-authoring service rejects the update attempt by the application. In response, the application requests an update from the service to obtain the current state. The request may include a list of chunks from the last base state of the temporary file such that the service can identify the delta chunks needed to bring the last base state in-sync with the current state of the hosted file. The service then sends its own update package to the application which includes the new delta chunks, a new list of chunk identifiers, and a new sequence number.

The application receives the update package and proceeds to establish a new state of the temporary file by incorporating the new delta chunks with its own recent changes. This may be accomplished by performing a three-way merge between a working copy of the temporary file, a base copy of the temporary file, and a download copy of the file (which represents the most current state of the hosted file known to the application). It is assumed for exemplary purposes that no conflicts are caused by the merge operations, although the application may include logic for resolving conflicts that arise.

The result of the three-way merge may be considered an upload copy of the temporary file, which can be compared to the download copy of the file to identify the changes to upload to the service. The application chunks the upload copy of the temporary file and generates a new list of chunk identifiers to compare to a list of chunk IDs for the download copy provided by the co-authoring service. The comparison tells the application which chunks in the upload copy of the temporary file are not in the hosted file and should be uploaded to the service. The application initiates another update to the service, which includes the new delta chunks, the new list of chunks, and the most recent sequence number provided by the service.

In a brief example, the application maintains multiple versions of the file at the application level including a base copy that represents the last-known host base state at the co-authoring service, and a working copy that represents the latest client edited state at the application. It is assumed for exemplary purposes the client's initial base state is represented by SN (sequence number)=1, while the host's current state is represented by SN=2, causing a coherency failure when the application attempts to update the co-authoring service with its changes.

The co-authoring service responds to the coherency failure by rejecting the application's update attempt. In response to the rejection, the application attempts to obtain the latest host state. To do so, the application tells the service what chunks it already has for the version SN=1. The service returns delta chunks that represent the difference between SN=1 and SN=2. The application applies the changes to the base state in a download copy of the file. At this point, the application is maintaining three copies of the file: the base copy, the working copy, and the download copy. The base copy represents a version of the file at SN=1, while the download copy represents a version of the file at SN=2.

The application then perform a three-way merge of the base copy of the file, the download copy of the file, and the working copy of the file to produce an upload copy of the file that represents the current state of the file at SN=2, plus the changes caused by the local edits. The upload copy of the file with SN=2 can be compared by the application to the download copy of the file (which also has SN=2) to identify the delta chunks and corresponding identifiers between the two versions of the file. The application will then upload the new delta chunks and their identifiers to the co-authoring service along with its current sequence number (SN=2).

The co-authoring service again compares the sequence number provided by the application to its own sequence number. Assuming they are the same, the co-authoring service updates the hosted file with the new delta chunks uploaded by the application. The co-authoring service may then increment the sequence number and return the new sequence number to the application. If the sequence numbers do not match, then the service repeats the steps above for the same condition. Likewise, the application repeats the steps outlined above in response to a failed update attempt.

In the same or other implementations, the file chunks may be defined such that they correspond to discrete parts of the file. For example, the file may be a .zip file, which is composed of multiple sub-files. The chunks of the file can be defined such that each chunk corresponds to an individual one of the sub-files. Dividing such files in this manner reduces the likelihood that a given chunk will have changed, and thus reduces the likelihood that the chunk will need to be downloaded as part of the sync operation.

Referring now to the drawings, FIGS. 1-10 illustrate various implementations of the co-authoring technology proposed herein. While the Figures emphasize co-authoring environments and implementations, it may be appreciated that the concepts apply as well to single-author environments and implementations.

FIG. 1 illustrates a co-authoring environment 100 in an implementation. Co-authoring environment 100 includes service provider 101, which provides one or more computing services to end points, represented by computing device 110, computing device 120, computing device 130, and computing device 140. Examples of such services include file storage and synchronization, as well as co-authoring support for user files. Service provider 101 employs one or more server computers co-located or distributed across one or more data centers connected to computing devices 110, 120, 130, and 140. Examples of such servers include web servers, application servers, virtual or physical (bare metal) servers, or any combination or variation thereof, of which computing device 1101 in Figure 11is broadly representative.

Figure 11:
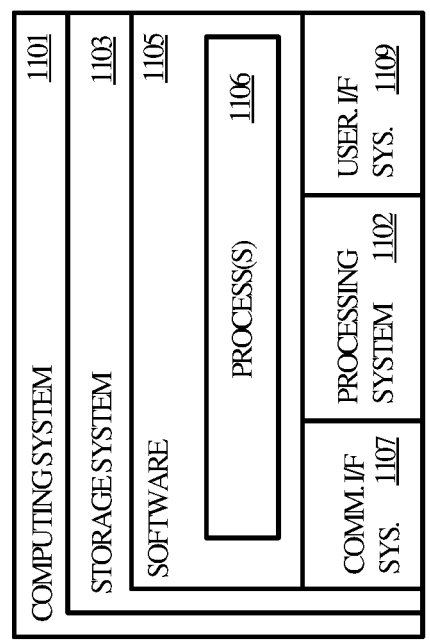
FIG. 11 illustrates a computing system suitable for implementing the various operational environments, architectures, processes, scenarios, and sequences discussed below with respect to the Figures.

Computing devices 110, 120, 130, and 140 communicate with service provider 101 via one or more internets and intranets, the Internet, wired and wireless networks, local area networks (LANs), wide area networks (WANs), and any other type of network or combination thereof. Examples of computing devices 101, 111, and 121 include personal computers, tablet computers, mobile phones, and any other suitable devices, of which computing device 1101 in FIG. 11 is broadly representative.

Each one of computing devices 110, 120, 130, and 140 includes a local environment in which one or more local applications and/or services run in coordination with and support for the file storage, synchronization, and co-authoring services provided by service provider 101. For example, computing device 110 includes local environment 111, which itself includes a sync engine 113 and application 115. Sync engine 113 is representative of a software application that synchronizes files stored locally on computing device 110 with their counterparts stored by service provider 101 "in the cloud." File 116 represents one such file that is stored locally and synced with a corresponding copy of the file hosted by service provider 101, represented by file 106. Similarly, computing devices 120, 130, and 140 include their own local environments where their local copies of the file reside, represented by files 126, 136, and 146 respectively.

Application 115 is representative of any software application in which a user can open and edit a file, including in the context of co-authoring. Examples of files include word processing documents, spreadsheets, slide presentations, notebooks, or the like, all of which are referred to herein as documents and/or files. Application 115 may be a natively installed and executed application, a browser-based application, a mobile application, or any other application suitable for co-authoring in electronic documents. Examples of application 115 include word processors, spreadsheet applications, presentation applications, and other productivity applications. Other examples include business applications, collaboration applications, email applications, gaming applications, and any other suitable application.

Generally speaking, sync engine 113 functions to keep file 116 in-sync with file 106 hosted by service provider 101. File 106 is stored locally such that it can be accessed by applications on computing device 110 via a local path. Sync engine 113 uploads a copy of file 116 to service provider 101 when changes occur locally in file 116 and/or at some other predetermined interval(s), and downloads copies of file 106 from service provider 101 when changes are made elsewhere that cause file 106 to change, which allows users to work on a given file from multiple locations and devices.

For example, user A may desire to edit file 116 on computing device 110. In the past, user A would open file 116 using application 115 and would proceed to make edits. As the edits were saved (and especially upon closing the file), sync engine 113 would upload the changed file to service provider 101 to replace file 106 so that the two versions are synced.

However, at the same time, one or more of users H, S, and W may also desire to edit files 126, 136, and 146 on computing devices 120, 130, and 140 respectively. As the files are all different versions of the same file (file 106), their edits would cause their respective sync engines to upload their own changed files to service provider 101 to also replace file 106. Depending upon the timing of the sync operations, several problems could occur. For example, the sync operations could cause collisions that service provider 101 would resolve by creating multiple conflict copies of file 106. In another example, file 106 could be repeatedly overwritten (replaced) by the most recent version of the file to be uploaded to the service.

To mitigate these and other problems, advances are disclosed herein that allow co-authoring channels to be established between file 106 and other versions of the file such as file 116, file 126, file 136, and file 146. File 106 can still be synced with those files as before, but their content can be edited simultaneously by multiple users without causing the conflicts and collisions described above. This is accomplished by establishing a co-authoring session between a temporary copy of a local file with the hosted version of the file in the cloud. Users can edit the temporary copy of file and their edits can be synced with the hosted copy of the file. The hosted copy of the file can then be synced with the local copies of the file.

Figure 2:
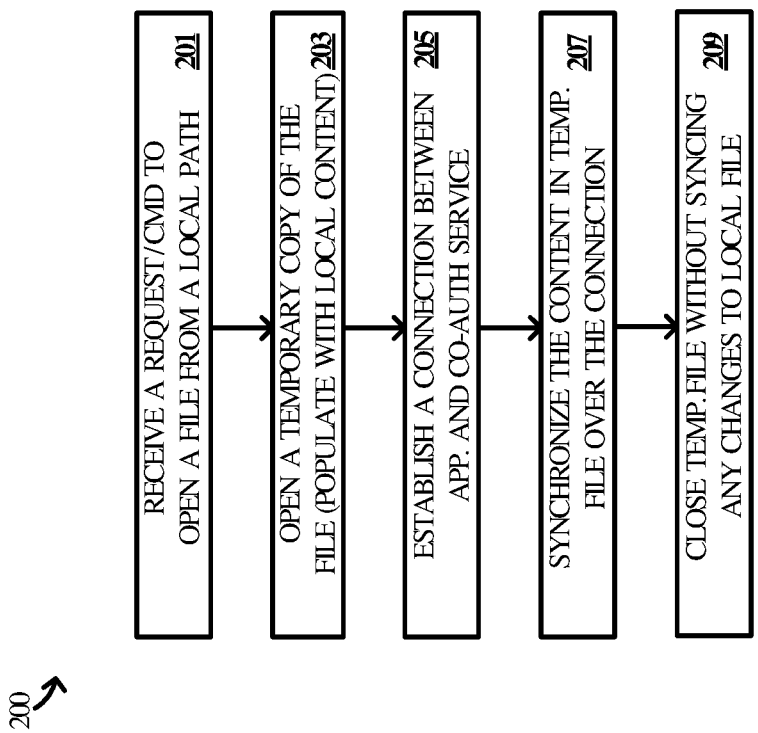
FIG. 2 illustrates a co-authoring process in an implementation.

FIG. 2 illustrates a co-authoring process 200 employed by a computing device to manage the syncing and co-authoring features described above. Co-authoring process 200 may be implemented in program instructions in the context of any of the software applications, modules, components, or other such programming elements of a computing device such as application 115 on computing device 110. The program instructions direct the computing device to operate as follows, referring parenthetically to the Steps in FIG. 2 in the context of co-authoring environment 100 for exemplary purposes.

Co-authoring process 200 begins when application 115 receives a request, command, or other such instruction to open file 116 from a local path (Step 201). The request may be prompted by a user action such as clicking on a file icon in a file system folder, for example, which directly or indirectly causes application 115 to begin the process of opening and reading file 116. However, rather than displaying the contents of file 116 in a user interface for the user to consume, application 115 instead opens a temporary file 117 in memory and populates the temporary file with the contents of the original file (Step 203). It is the temporary file 117 that application 115 then displays in a user interface, while the original file (file 116) is closed.

Application 115 also establishes a connection with a co-authoring service provided by service provider 101 (Step 205). The connection represents a channel between the application and co-authoring service through which edits made by multiple users to multiple instances of the file can be propagated. The co-authoring service manages the changes to mitigate (or eliminate) change conflicts, inconsistencies, version control, and other aspects of co-authoring. Application 115 therefore synchronizes changes made in temporary file 117 over the connection with the co-authoring service (Step 207). Synchronizing the changes may include, for example, uploading changes to the co-authoring service made in temporary file 117, as well as downloading changes implemented in file 106 due to other co-authoring edits by other users, or due to other sync operations performed with respect to file 106.

Application 115 may then close the temporary file 117 in response to a file-close event, but without persisting any changes to file 116 (step 209). Rather, file 116 is kept in-sync with file 106 by sync engine 113. This way, application 115 is freed from having to keep file 116 in-sync with file 117 and instead can focus on keeping file 117 in-sync with file 106.

It may be appreciated that, in some implementation, application 115 may lock file 116 throughout co-authoring process 200, so that it cannot be changed by sync engine 113 or any other processes or applications. In addition, in some implementations, application 115 may abandon co-authoring process 200 if file 116 is out-of-sync with hosted file 106 from the start, in which case file 116 may simply be opened and edited locally, with any changes being synced by the normal operations sync engine 113. Whether file 116 is in-sync may be indicated by a flag maintained in file 116 or by some other mechanism.

Figure 3:
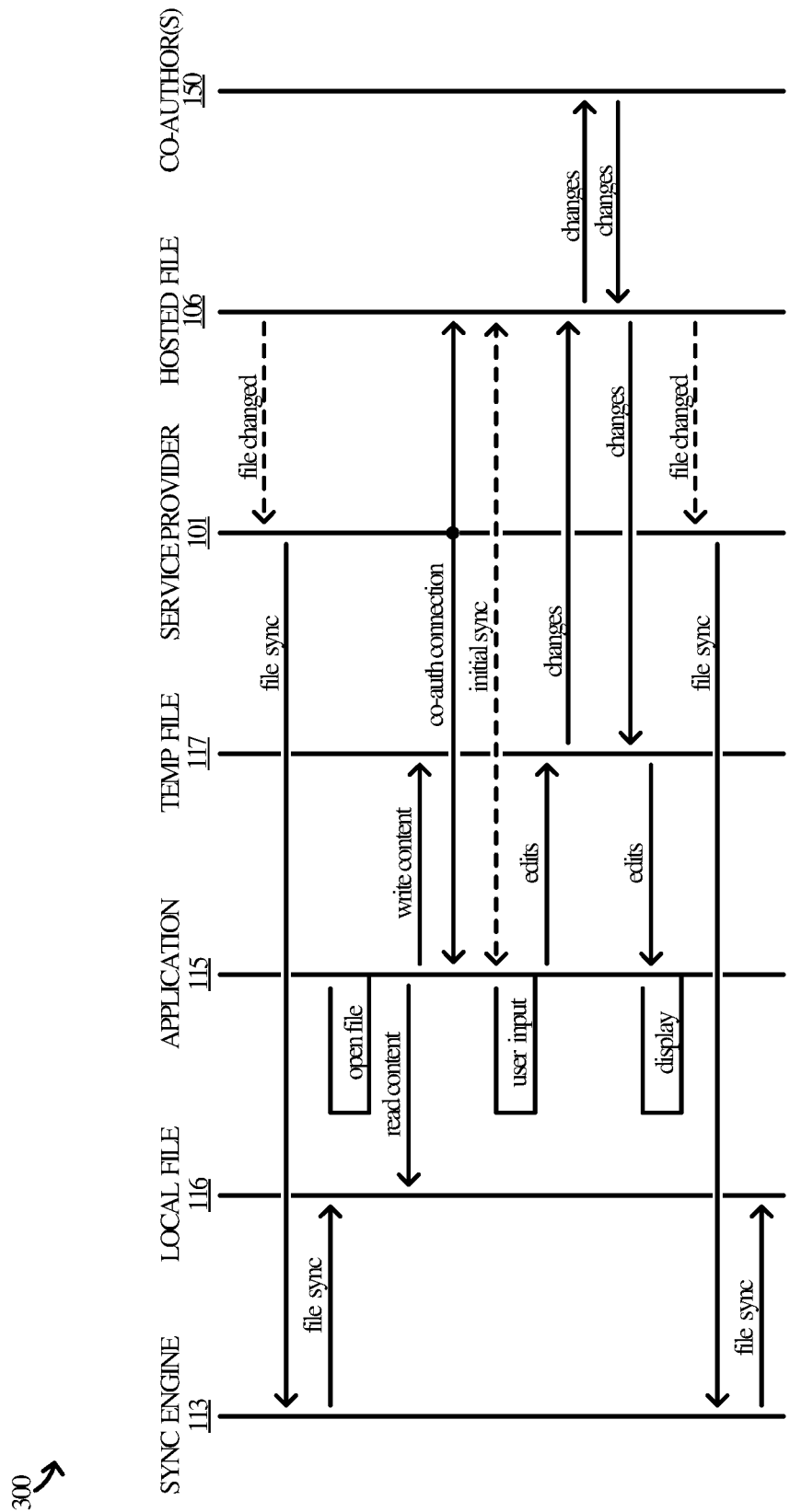
FIG. 3 illustrates an operational scenario in an implementation.

FIG. 3 illustrates an operational scenario 300 to better visualize how co-authoring process 200 fits into the overall operations of co-authoring environment 100. In operation, file 116 hosted by service provider 101 may change for any number of reasons. For example, other synced copies of file 106 may have changed, causing file 106 to change. Alternatively, changes made via co-authoring sessions may results in changes to file 106. Regardless, the changed state of file 106 causes it to be synced by service provider 101 with file 116 via sync engine 113. File 116 therefore becomes up to date with respect to the most recent state of file 106.

Application 115 is subsequently instructed to open file 116 and responsively reads the contents of file 106 and writes them into temporary file 117, which is created to support a co-authoring connection setup between application 115 and file 106 and/or the co-authoring service. Temporary file 117 is displayed in a user interface as soon as possible for a user to consume. In the background, application 115 conducts an initial sync operation to make sure that the contents of temporary file 117 are in-sync with those of file 106. Moving forward, the user can make edits to temporary file 117 through the user interface which application 115 uploads to the co-authoring service and file 106. Similarly, changes made by one or more of the other co-authors 150 are uploaded to file 106 and synced down to temporary file 117.

It may be appreciated that the co-authoring connection bypasses sync engine 113. That is, sync engine 113 does not sync temporary file 117, and so any changes made to temporary file 117 are not seen by sync engine 113. Rather, the changes to temporary file 117 are uploaded to the co-authoring service over a communication path, link, or other such connection that has nothing to do with sync engine 113 and its corresponding sync service in service provider 101.

The co-authoring session is eventually terminated and the state change of file 106 causes it to be synced again with its corresponding local copies. As such, service provider 101 syncs file 106 with file 116. In this manner, file 116 is updated to the most recent version of file 106 through sync engine 113, which includes the co-authoring edits made locally in the temporary file 117 and those made remotely by other co-authors. In this manner, file 116 is updated with the changes made in the context of the co-authoring session(s), without having to be part of the co-authoring session(s) itself. Moreover, this allows sync engine 113 and its corresponding sync service to operate normally and without any modifications. Users can continue to open shared files from local paths and enjoy the benefits of co-authoring.

Figure 4:
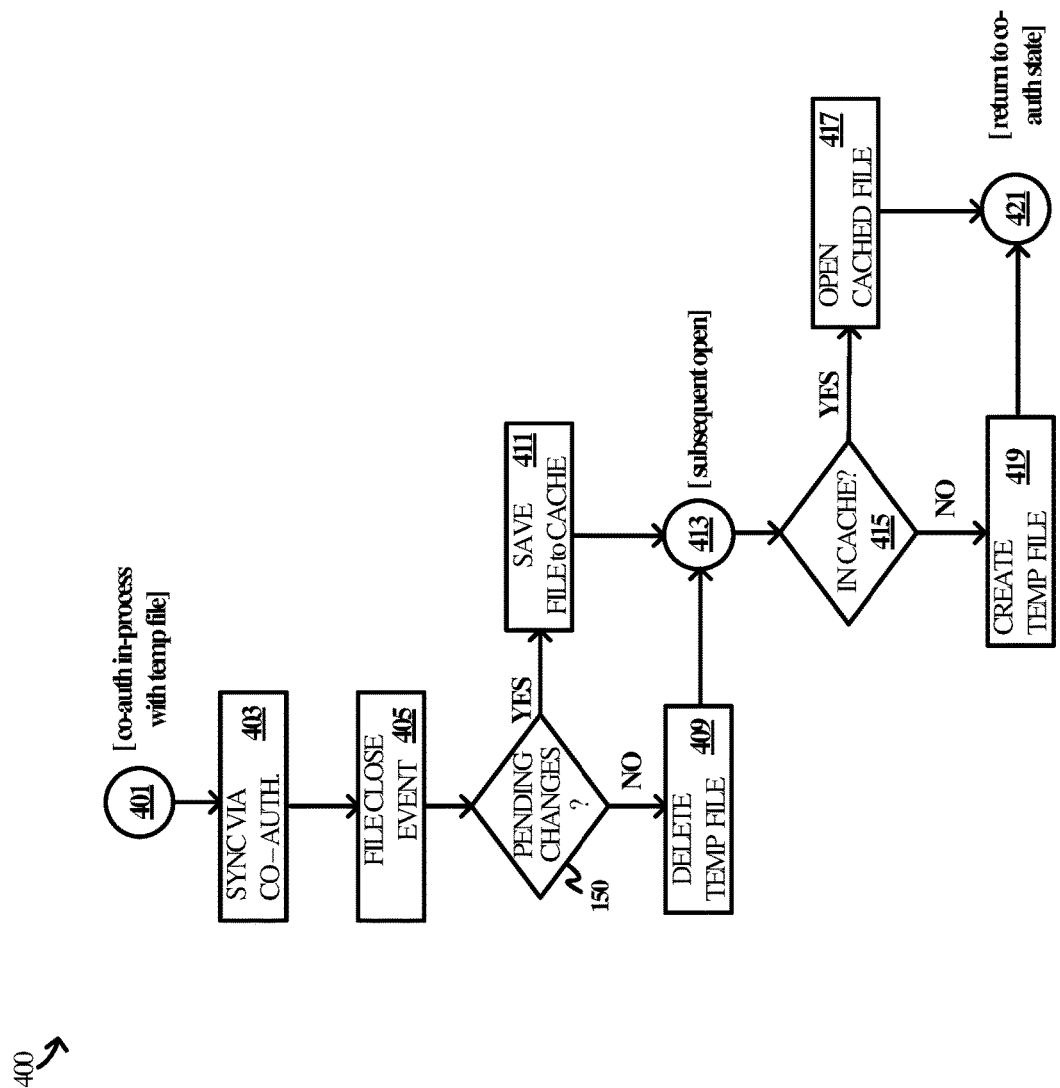
FIG. 4 illustrates a co-authoring process in an implementation.

FIG. 4 illustrates another co-authoring process employed by a computing device to manage the syncing and co-authoring features described above. Co-authoring process 400 may be implemented in program instructions in the context of any of the software applications, modules, components, or other such programming elements of a computing device such as application 115 on computing device 110. The program instructions direct the computing device to operate as follows, referring parenthetically to the Steps in FIG. 4 in the context of co-authoring environment 100 for exemplary purposes.

Co-authoring process 400 begins at Step 401 with the assumption that application 115 has opened a temporary file and connected with the co-authoring service in service provider 101. The temporary file has been populated with content from a locally synced file and moving forward, changes made to the temporary file are synced via the co-authoring service with a hosted version of the file (Step 403) over the established connection.

A file-close event occurs (Step 405), which application 115 responds to by determining whether there are any pending changes to upload to the cloud (Step 407). Alternatively (or in addition), application 115 may determine whether it is still online with the co-authoring service. If there are changes pending to be uploaded—and assuming the application is offline and cannot upload them—then the temporary file is saved to a document cache associated with the application (Step 411). If there are no changes pending, then application 115 can delete the temporary file (409). The temporary file may be deleted even if the application is offline, although in some cases, the temporary file may be saved to the document cache as a safety measure when offline, even if there are no pending changes.

A subsequent open of the associated local file is eventually initiated (Step 413), such as when the user returns to the document at a later time. Application 115 first checks whether a corresponding file is resident in the document cache (Step 415). If so, application 115 opens the cached document as the temporary file (Step 417). However, if the document cache holds no corresponding file, then application 115 creates a new temporary file and hydrates it with content from the local version of the file (Step 419). In either case, once the temporary file is open, application 115 returns to a co-authoring state (Step 421) by connecting to the co-authoring service, syncing changes between the temporary file and the cloud version of the file, and so on as described above and throughout.

Figure 5:
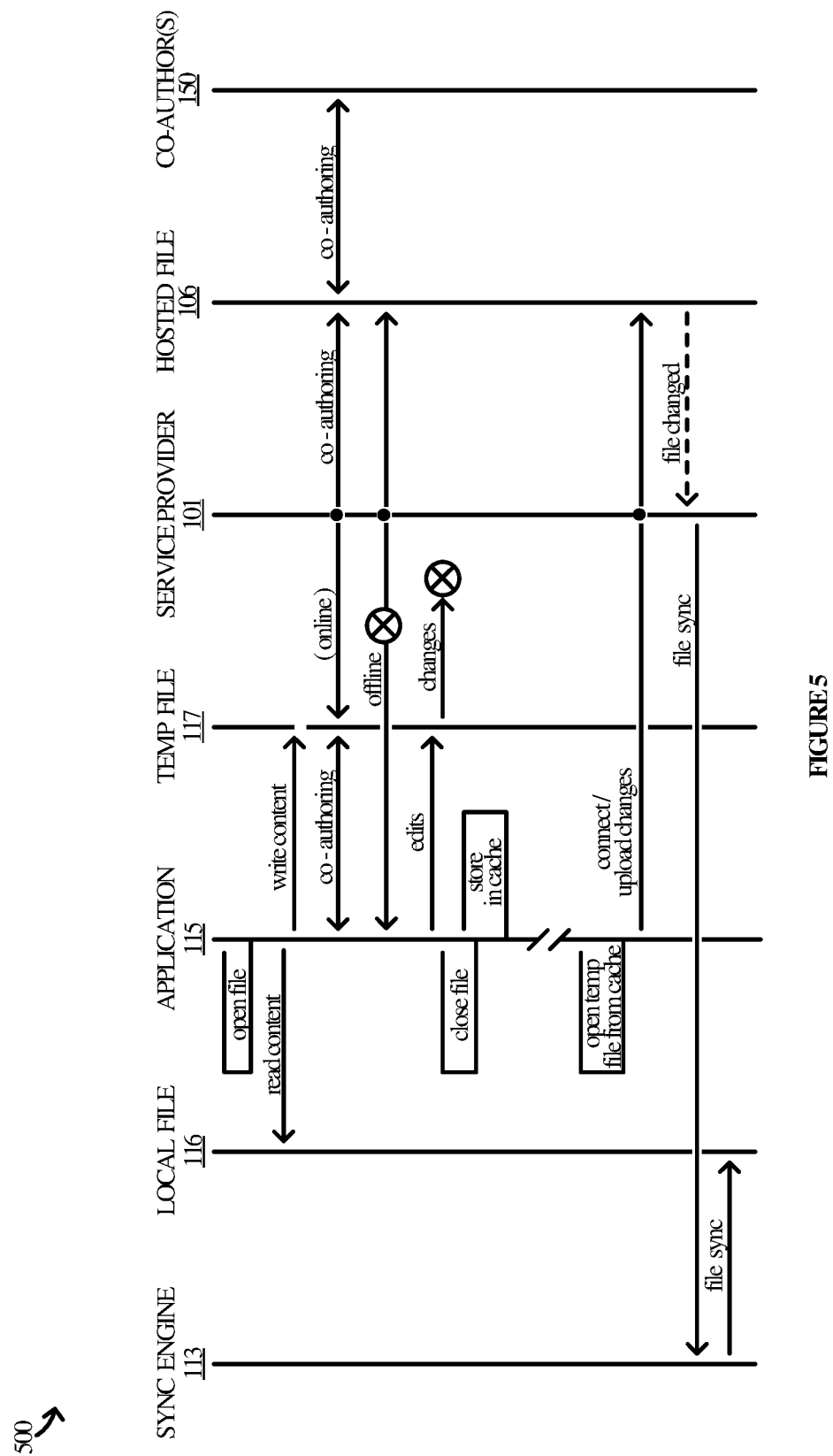
FIG. 5 illustrates another operational scenario in an implementation.

FIG. 5 illustrates another operational scenario to understand how co-authoring process 400 may apply to the overall operations of co-authoring environment 100 when application 115 goes offline for a period of time.

In operational scenario 500, application 115 is instructed to open file 116. The application responsively reads the contents of file 106 and writes them into temporary file 117, which is created to support a co-authoring connection setup between application 115 and file 106 and/or the co-authoring service. Temporary file 117 is displayed in a user interface as soon as possible for a user to consume.

In the background, application 115 may conduct an initial sync operation to make sure that the contents of temporary file 117 are in-sync with those of file 106. Moving forward, the user can make edits to temporary file 117 through the user interface which application 115 uploads to the co-authoring service and file 106. Similarly, changes made by one or more of the other co-authors 150 are uploaded to file 106 and synced down to temporary file 117.

At a point in time while the user has temporally file 117 open and active in a user interface, application 115 goes offline with respect to service provider 101, the co-authoring service, and file 106. This may occur if, for example, computing device 110 loses Internet connectivity or otherwise cannot reach service provider 101. Any changes made by the user during the offline period are persisted in temporary file 117 but cannot be uploaded to service provider 101. However, rather than discarding or otherwise losing the changes when a close-file event occurs, application 115 stores temporary file 117 in its document cache. The document cache may be a location in system memory, a location on-disk (or other persistent memory), or a combination of the two when the contents of system memory are persisted to disk.

In either case, the contents of the document cache are available to application 117 upon a subsequent attempt to open the local file. Per co-authoring process 400, when application 117 is directed to open file 116, it first checks in the document cache to determine whether a corresponding temporary file had previously been stored in the cache. It is assumed so here for exemplary purposes and application 115 opens the temporary file directly from the cache, rather than creating it anew and populating it with the content from file 116. If application 115 is online during the subsequent open, application 115 immediately uploads any pending changes from the temporary file to hosted file 106.

Those changes trigger a sync operation to be conducted by service provider 101 and sync engine 113 to bring file 116 in-sync with file 106, which implicitly also brings it in-sync with temporary file 117. Application 115 may keep temporary file 117 open and commence with establishing a new connection with the co-authoring service since it will be in-sync with file 106. Alternatively, application 115 may close and delete temporary file 117, create a new temporary file, and hydrate the new temporary with the content from file 106, since it will have been recently updated.

Figure 6B:
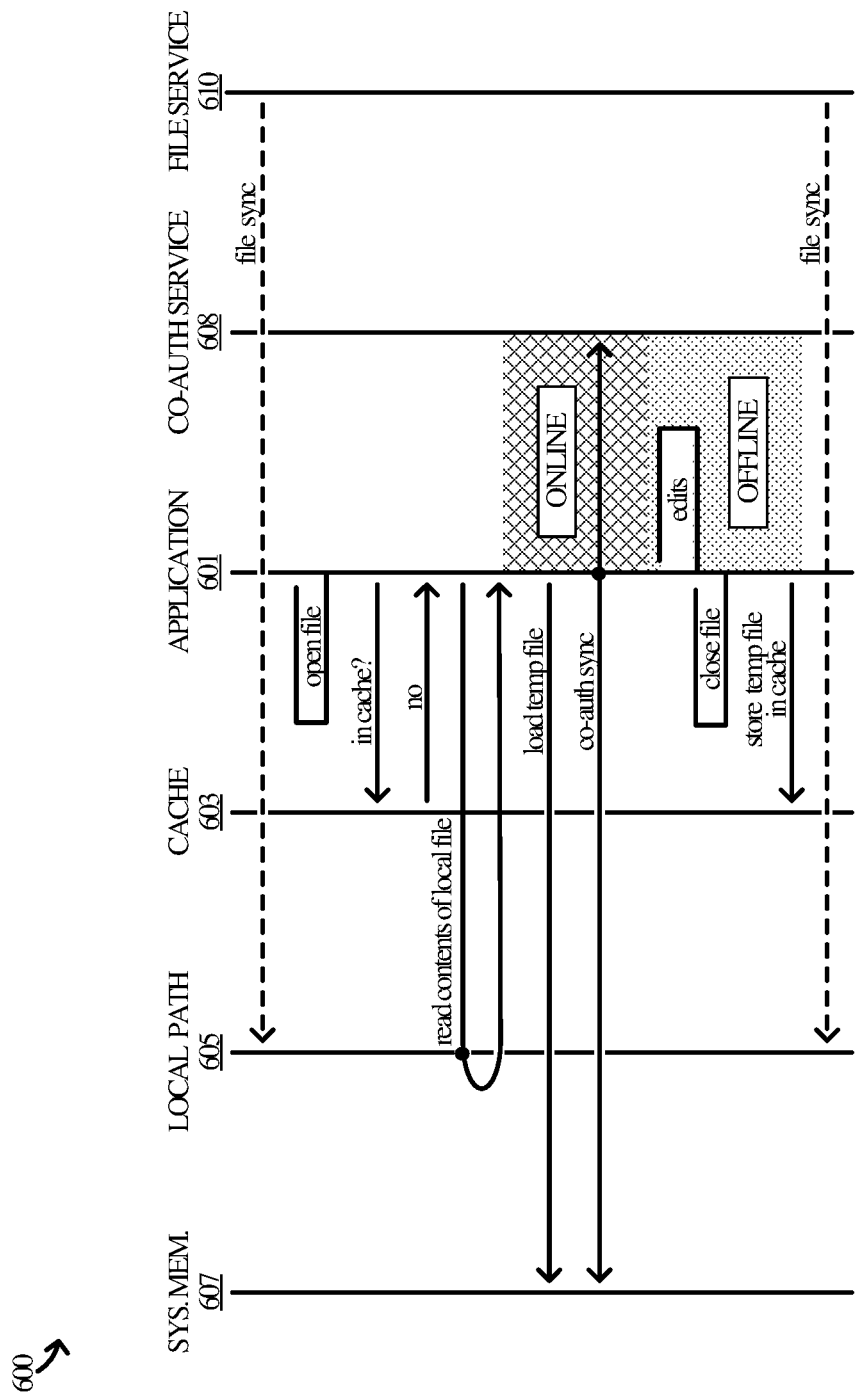
Figure 6C:
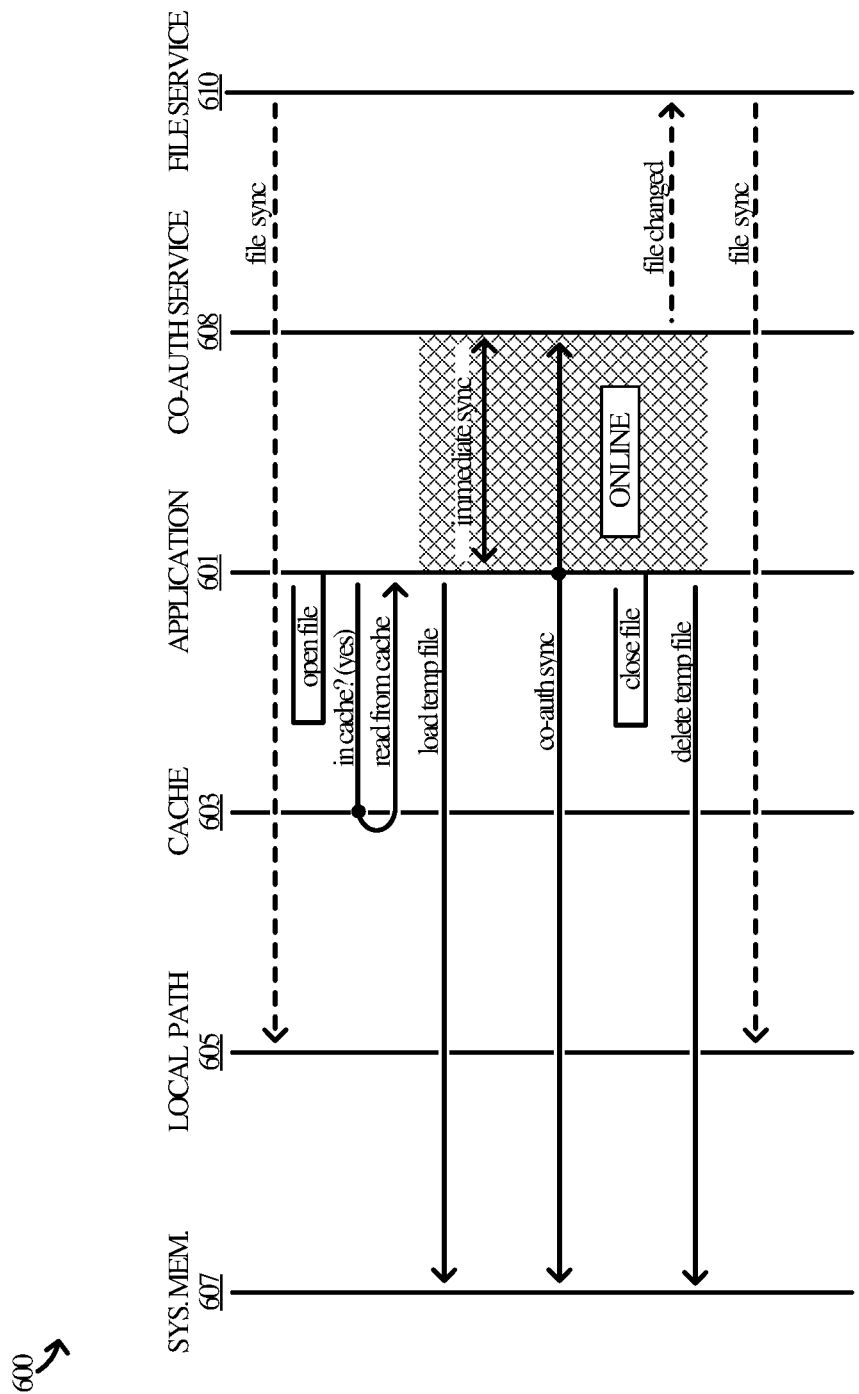

FIGS. 6A-6C illustrate operational scenario 600 in an extended example that visualizes a number of different sub-scenarios, such as when an application is online, offline, and returning after having been offline. Operational scenario 600 includes an application 601 on a computing system that communicates with a co-authoring service 608 remote from the computer (e.g., in the cloud). Operational scenario also includes a file service 610 that stores a hosted copy of a file that is the subject of co-authoring activities. A local copy of the file is stored on the same computer that hosts application 115 and is accessible via local path 605, which may point to local storage or may redirect elsewhere (e.g., a storage peripheral or even another file service). The computer includes system memory 607 such as random-access memory (RAM) used by application 601.

To begin, the hosted file in the cloud may have changed, potentially causing a file service 610 to download the file to a local sync engine on the computer. The local sync engine updates and/or replaces the file via local path 605. Application 601 is subsequently instructed to open the file via local path 605 but instead of doing so, first determines whether a temporary version of it resides in cache 603. Cache 603 represents a portion of system memory 607 and/or persistent memory (e.g., a hard drive on the computer) where application 601 maintains various documents for its own internal use. In other words, the documents in cache 603 are not synced by the sync engine and are not managed by file service 610.

It is assumed here for exemplary purposes that a temporary file is not present in the cache, and so application 601 accesses the local file via local path 605 and writes its content in a new temporary file in system memory 607. Application 601 also opens the temporary file in a user interface as soon as possible, so that a user can begin consuming the file contents.

Application 601 also connects to co-authoring service 608 to obtain any changes to the hosted file that may not be present in the local file. For example, changes may have been made to the hosted file in the interim since it was last synced with the local file.

Once application 601 has connected to co-authoring service 608, any edits made locally to the temporary file in system memory 607 are synced via the channel established between the application and the co-authoring service, bypassing both the local file, any local sync engine, and file service 610. Rather, co-authoring service 608 makes the changes to the hosted file, which is stored in file service 610.

A file close event eventually occurs, in response to which application 601 determines whether any pending changes need to be uploaded. It is assumed here that application 601 has remained online with co-authoring service 608, allowing all changes to be synced. Application 601 therefore deletes the temporary version of the file out of system memory 607. In the background, file service 610 will detect that the hosted file has changed and will sync it back down to the local file via local path 605.

Operational scenario 600 continues in FIG. 6B. Here, another file sync may have occurred between file service 610 and the local file. Regardless, when application 601 is presented with an open file event, the application again determines whether a corresponding cached copy of the file is present in cache 603. It is again assumed that no cached file exists. Application 601 instead reads the contents of the local file and loads them into a new temporary file in system memory 607 so that the user can begin to consume the document.

Application 601 also connects to co-authoring service 608 to obtain any changes to the hosted file that may not be present in the local file. For example, changes may have been made to the hosted file in the interim since it was last synced with the local file.

Once application 601 as connected to co-authoring service 608, any edits made locally to the temporary file in system memory 607 are synced via the channel established between the application and the co-authoring service, bypassing both the local file, any local sync engine, and file service 610. Rather, co-authoring service 608 makes the changes to the hosted file, which is stored in file service 610.

It may be appreciated that a situation could also occur whereby application 601 is never online with co-authoring service 608. In such a situation, application 601 would load the temporary file with the content from the local file and save any changes to the temporary file.

Regardless, at this juncture it is assumed that application 601 is offline with respect to co-authoring service 608 and cannot upload any changes to the hosted version of the file made while offline. Instead, any edits that are made to the file are saved to the temporary file, which application 601 saves to the document cache (cache 603). In the background, file service 610 may continue to update the local file, assuming other changes are occurring in the hosted file, such as if other users are making changes in it. The local file may thus reflect those changes, but it will not reflect the changes made locally in the temporary version of the file. Rather, those changes will be present only in the cached copy of the file.

In FIG. 6C, operational scenario 600 continues as before, except that this time, when application 601 checks the document cache, a temporary version of the file (or cached version) is present in cache 603. This is the result of the offline state that occurred in FIG. 6B. Application 601 therefore loads the temporary file into system memory 607 and performs an immediate sync with co-authoring service 608 (under the assumption that it is online and connected to application 601).

Once application 601 as connected to co-authoring service 608, any edits made locally to the temporary file in system memory 607 are synced via the channel established between the application and the co-authoring service, bypassing both the local file, any local sync engine, and file service 610. Rather, co-authoring service 608 makes the changes to the hosted file, which is stored in file service 610.

A file close event eventually occurs, in response to which application 601 determines whether any pending changes need to be uploaded. It is assumed here that application 601 has remained online with co-authoring service 608, allowing all changes to be synced. Application 601 therefore deletes the temporary version of the file out of system memory 607. In the background, file service 610 will detect that the hosted file has changed and will sync it back down to the local file via local path 605.

FIG. 7 illustrates a sync process 700 employed by a computing device to implement some of the syncing and co-authoring features described above. Sync process 700 may be implemented in program instructions in the context of any of the software applications, modules, components, or other such programming elements of a computing device such as a client computer (e.g., computing device 110). For example, sync process 700 could be employed by a client computer device that is uploading and/or downloading changes to/from a co-authoring service. The program instructions direct the subject computing device to operate as follows, referring parenthetically to the Steps in FIG. 7.

Sync process 700 begins with identifying a base description of a subject file (step 701). The base description includes a list of chunk identifiers produced by hashing chunks of the file, as well as a sequence number provided most recently by the co-authoring service. The computer splits or otherwise logically divides file into chunks of non-uniform sizes such that the size of at least one of the chunks differs relative the size of one or more other chunks. In some scenarios, the chunks may be defined to align with the contents of a container file such as a .zip file. For instance, if the .zip file includes a number of text files, a number of images files, and/or other content, the chunks of the .zip file could be defined to correspond to each individual file. A first chunk would map to the bits of a first text file in the container, for example, while another chunk would map to a second file, while still another would map to a third file, and so on. In this manner, each individual chunk would map to only a single sub-file of the container file, rather than mapping to all or portions of two or more sub-files.

Hashing the chunks includes supplying each individual chunk as input to a hash function that produces a corresponding hash value as output. The chunk identifier (ID) for a given chunk would thus comprise the resulting hash value, either by itself or in combination with other identifying information.

After a period of time, the file may have changed due to local edits or the like, leading sync process 700 to generate an updated description of the file (step 703). The updated description also includes a list of chunk identifiers produced by re-hashing the file. Sync process 700 compares the updated list to the base list to determine whether any delta chunks exist in the file in its changed state (step 705). For example, the presence of a new hash value in in the updated list relative to the base list would indicate that one of the chunks had changed and/or that a new chunk exists.

Sync process 700 then sends an update package to the co-authoring service that includes the delta chunk(s), the sequence number, and the updated list of chunk identifiers (step 707). The list of chunk identifiers and the sequence number may be included together in a signature file. The co-authoring service implements the changes if its version of the sequence number matches that provide by the client computing device but rejects the changes if the sequence numbers do not match.

Sync process 700 determines at step 709 whether the update was accepted, which may be determined by the reply supplied by the co-authoring service (step 709). An indication that the update was accepted successfully returns effectively ends sync process 700 and returns it to the start. However, an indication that the rejection was updated causes sync process 700 to send a request for an update from the co-authoring service that includes delta chunks, chunk identifiers, and a new sequence number (step 711).

Sync process 700 downloads the update from the co-authoring service and merges them into various copies of the subject file (step 713). This may be accomplished by performing a three-way merge between a working copy of the temporary file, a base copy of the temporary file, and a download copy of the file (which represents the most current state of the hosted file known to the application). It is assumed for exemplary purposes that no conflicts are caused by the merge operations, although the application may include logic for resolving conflicts that arise. The result of the three-way merge may be considered an upload copy of the temporary file, which can be compared to the download copy of the file to identify a new update package to upload to the service (Step 715).

The client chunks the upload copy of the temporary file and generates a new list of chunk identifiers to compare to a list of chunk IDs for the download copy provided by the co-authoring service. The comparison tells the client which chunks in the upload copy of the temporary file are not in the hosted file and should be uploaded to the service.

The process returns to step 707 upon identifying the delta chunks such that another attempt to update the hosted copy of the file can be made. The new attempt will include the delta chunks identified in step 715, as well as the most recent sequence number provided by the service to the client computer. In this manner, sync process 700 can upload a revised signature package to the co-authoring service that includes the original delta chunks that have yet to be accepted by the service, which will have been identified again at step 715. Assuming the update is accepted by the service, the service changes the hosted copy of the file and sends a new sequence number to the client. If the sequence numbers do not match again, then the service would reject the update package and provide its own update package. Sync process 700 would continue to cycle through steps 711-715 and steps 707-709 until the files are synchronized.

Figure 8:
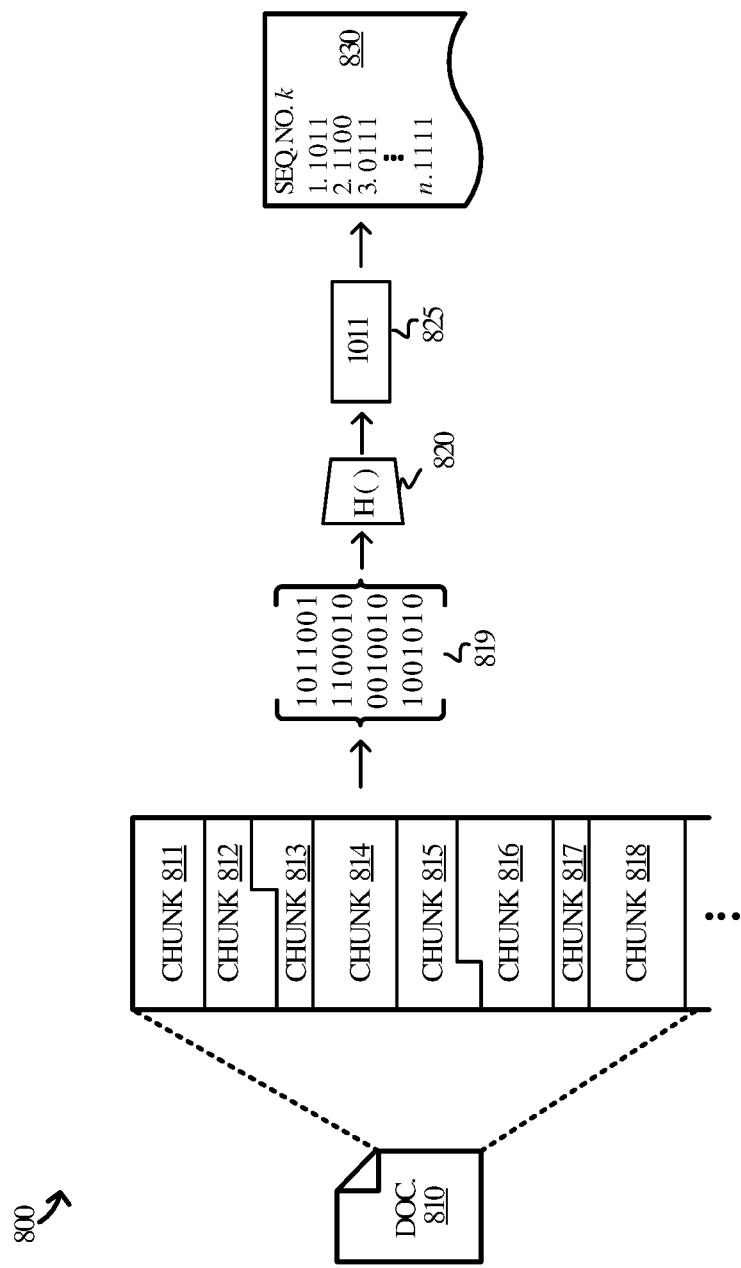
FIG. 8 illustrates a sync environment in an implementation.

FIG. 8 illustrates a sync environment 800 and brief operational scenario. Sync environment 800 includes document 810, hash function 820, and signature file 830. In operation, document 810 is split into various chunks represented by chunks 811-818. Each chunk is supplied as input to hash function 820, which produces a chunk ID 825. For example, chunk 819 (which is representative of any of the chunks 811-818) is hashed to produce chunk ID 825. In a highly simplified example, note that the many bits of chunk 819 are reduced to a 4-bit chunk ID. Signature file 830 is populated with a sequence number k, as well as the list of chunk IDs produced by hash function 820. As described above with respect to FIG. 7, the signature file 830 is used to determine whether and which delta chunks to upload and/or download in the context of sync process 700.

It may be appreciated that mapping the chunks to logical divisions of the files (e.g., to the sub-parts of a container file), reduces the likelihood that any given chunk has changed, thereby further reducing how many bits are actually sent/received. Assume for example that a file being synced is a slide presentation document whose data structure is actually a container file. Further assume that the container file includes multiple text files and multiple image files. The container file can be chunked by mapping each chunk precisely to a different one of the files, without overlapping with any of the other files.

Further assume that one of the text files incurs a change. Such a change would be surfaced by a change in the hash value of the chunk corresponding to the text file. Thus, the chunk ID corresponding to the one text file as maintained on the client will differ from the chunk ID corresponding to the same text file as maintained on the server. The delta chunk corresponding to the differing chunk ID will thus be downloaded (or uploaded) to bring whichever file is less recent into sync with the other. In the past, if the chunk overlapped with another one of the files—such as part of one of the image files—then both the first text file and the image file would have to be downloaded/uploaded.

Figure 9:
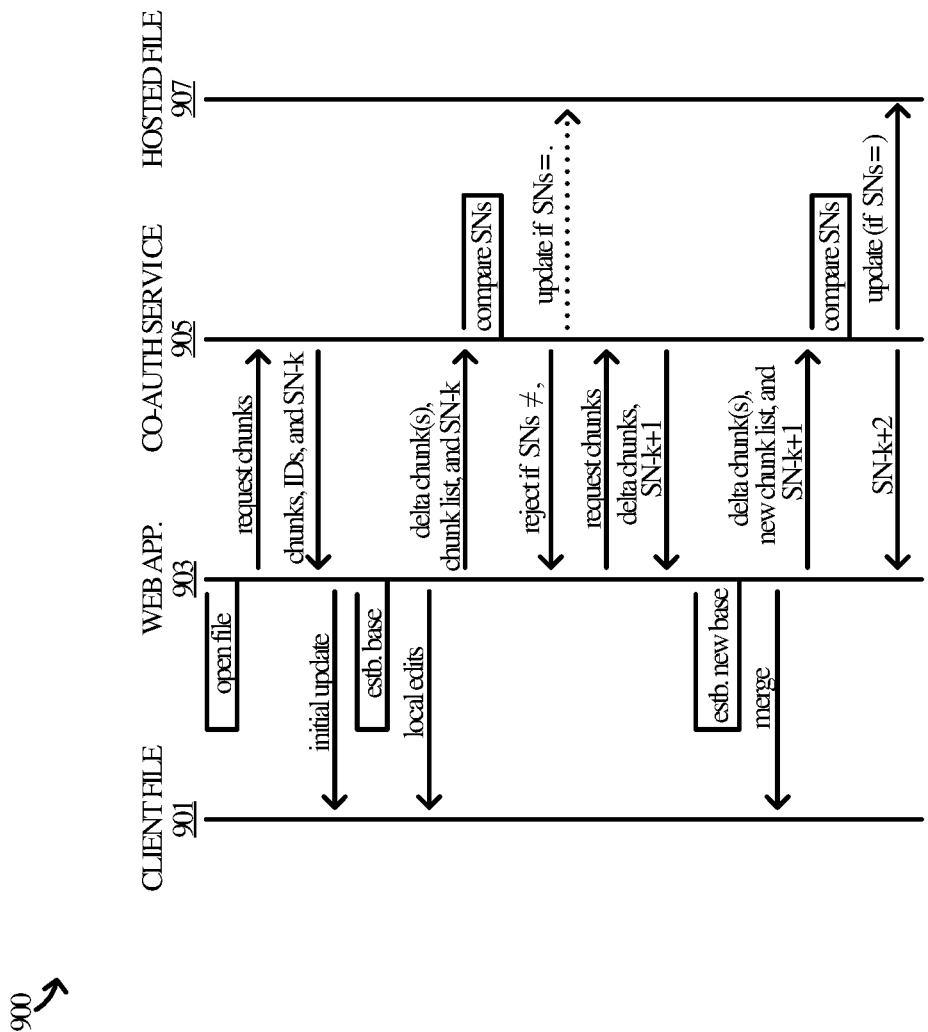
FIG. 9 illustrates an operational scenario in an implementation.

FIG. 9 illustrates a brief operational scenario in a highly simplified implementation of the syncing protocol described above with respect to FIG. 7. Operational scenario 900 involves a client file 901, a web application 903, co-authoring service 905, and a hosted file 907.

Client file 901 is representative of any file that may be opened by web application 903 on a computing device that hosts web application 903. Non-limiting examples include word processing documents, spreadsheets, slide presentations, and the like.

Web application 903 is representative of any application that may run in the context of a web browser on the computing device. Examples include—but are not limited to—word processing applications, spreadsheet applications, and slide presentation applications. Web application 903 may open client file 901 from a location on the computing device or from a remote location external to the computing device.

Co-authoring service 905 is representative of any service or sub-service implemented in the cloud that supports the collaborative and simultaneous editing of content by multiple users. In this scenario, co-authoring service 905 supports co-authoring in hosted file 907 by multiple users through their own instances of the file (e.g., client file 901).

More particularly, client file 901 represents an instance of hosted file 907 that web application 903 and co-authoring service 905 seek to keep synchronized with each other. Towards that end, web application 903 employs sync process 700 in the context of a larger synchronization process illustrated in operational scenario 900.

To begin, web application 903 opens client file 901 from its location and immediately requests an update from co-authoring service 905. The intent of the request to is make sure that client file 901 is initially in-sync with hosted file 907, which may be considered the authoritative copy of the file. Client file 901 may be out-of-sync at the time it was opened for any number of reasons. For example, a separate synchronization process employed by a background storage service may be behind relative to more recent changes made to hosted file 907. In any case, co-authoring service 905 provides web application 903 with an initial update package to bring client file 901 fully up to date.

The initial update package includes all of the chunks of hosted file 907, as well as an initial list of chunk identifiers and the most recent serial number for hosted file 907 (SN-k). Web application 903 updates client file 901 with the chunks to the extent necessary and also establishes a base state of client file 901. The base state includes at least the list of chunk identifiers for all of the chunks of client file 901, as well as the serial number SN-k.

Over time, local edits may be implemented in client file 901 causing changes that need to be synced with hosted file 907. To do so, web application 903 again divides client file 901 into chunks and hashes each chunk to generate an updated list of chunk identifiers. Web application 903 also compares the updated list of chunk identifiers to the base list of chunk identifiers to determine which chunks of client file 901 have changed since the file was last synchronized with hosted file 907. Web application 903 sends an update request to co-authoring service 905 with the delta chunks resulting from the comparison, as well as a signature file that includes the updated list of chunk identifiers and the sequence number SN-k.

Co-authoring service 905 receives the update package, including the signature file, and compares the sequence number provided in the signature file to its own current sequence number. If the sequence numbers match, then co-authoring service 905 would update hosted file 907 with the delta chunks provided by web-application 903. However, if the sequence numbers do not match—which is assumed here for exemplary purposes—co-authoring service 905 would reject the update attempt.

In response, web application 903 requests an update from co-authoring service 905 to obtain the delta chunks needed to bring client file 901 up-to-date. However, this request includes information that reflects the most recent base state maintained by web application 903. Co-authoring service 905 replies with an update package of its own to bring client file 901 in-sync with hosted file 907. The update package sent to web application 903 includes one or more delta chunks that represent the difference between the current state maintained by co-authoring service 905 and the most recent base state maintained by web application 903. The update package also includes a new list of chunk identifiers and a new (incremented) sequence number SN-k+1. Co-authoring service 905 is able to determine which chunks to send as the new delta chunks by comparing the list of chunks in the signature file provided by web-application 903 as part of its update request.

Web application 903 receives the update package from co-authoring service 905 and updates client file 901 with the delta chunks provided in the update. This may be accomplished in a variety of ways, one example of which includes maintaining multiple versions of the file locally and performing a multi-file merge. That is, web application 903 may maintain a working copy of client file 901, as well as a base copy of the file that represents client file 901 in its base state. A download copy may also be maintained that represents the base copy plus the changes provided by co-authoring service 905 in its update.

To bring the working copy of client file 901 up-to-date, web application 903 performs a three-way merge of the three files to produce an upload copy of client file 901. Web application 903 can then chunk and has the upload copy of client file 901, as well as the download copy of the file. A comparison of the chunk IDs for the upload copy to chunk IDs for the download copy indicates to web application 903 which chunks in the upload copy of client file 901 are not possessed by hosted file 907 and thus need to be uploaded. Next, web application 903 makes another attempt to update co-authoring service 903. This time, the update package includes the new delta chunks, a new list of chunk identifiers, and the most recent sequence number provided by the service: SN-k+1. It is assumed for exemplary purposes that the sequence numbers match. Accordingly, co-authoring service 905 updates hosted file 907 with the delta chunks and replies to web application 903 with the incremented sequence number: SN-k+2. Web application 903 will then use the new sequence number the next time it attempts to send an update to co-authoring service 905.

Figure 10:
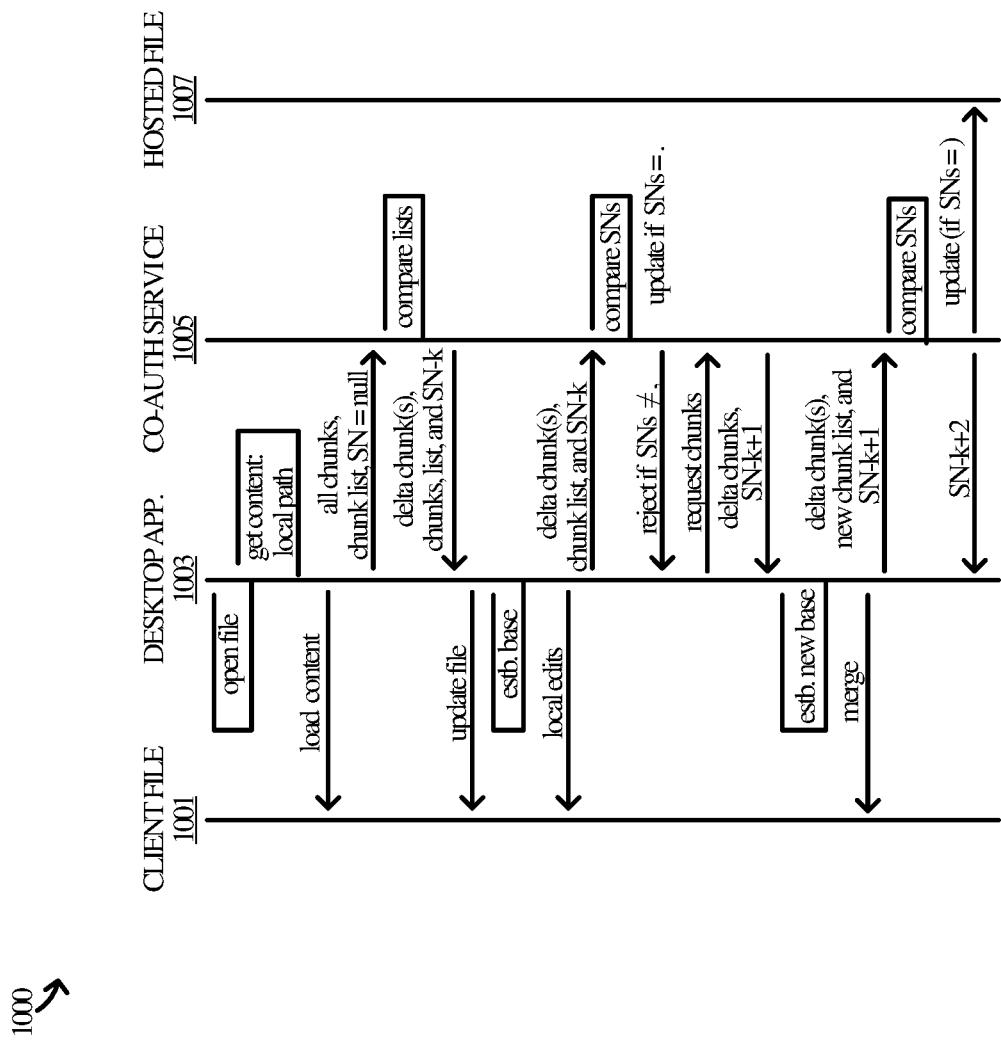
FIG. 10 illustrates another operational scenario in an implementation.

FIG. 10 illustrates another brief operational scenario in a highly simplified implementation of the syncing protocol described above with respect to FIG. 7. Operational scenario 1000 involves a client file 1001, a desktop application 1003, co-authoring service 1005, and a hosted file 1007.

Client file 1001 is representative of any file that may be opened by desktop application 1003 on a computing device. Non-limiting examples include word processing documents, spreadsheets, slide presentations, and the like.

Desktop application 1003 is representative of any application that may be locally installed and natively executed the computing device. Examples include—but are not limited to—word processing applications, spreadsheet applications, and slide presentation applications. Desktop application 1003 may open client file 1001 from a location on the computing device or from a remote location external to the computing device. In some implementations, client file 1001 is analogous to temporary file 117 in FIG. 1. For instance, client file 1001 may be opened by desktop application 1003 and hydrated with content from another local application (e.g., local application 116 in FIG. 1).

Co-authoring service 1005 is representative of any service or sub-service implemented in the cloud that supports the collaborative and simultaneous editing of content by multiple users. In this scenario, co-authoring service 1005 supports co-authoring in hosted file 1007 by multiple users through their own instances of the file (e.g., client file 1001).

More particularly, client file 1001 represents an instance of hosted file 1007 that web application 1003 and co-authoring service 1005 seek to keep synchronized with each other. Towards that end, desktop application 1003 employs sync process 700 in the context of a larger synchronization process illustrated in operational scenario 1000.

To begin, desktop application 103 opens client file 1001 and populates it with content from another version of hosted file 1007, such as a file stored locally that is synced separately via a local sync engine. However, the file that supplies the content for client file 1001 may not be fully in-sync with hosted file 1007. To ensure that client file 1001 is fully in-sync, desktop application 101 initials an initial syncing operation by sending all of its chunks and its entire chunk list (generated by hashing the chunks) to co-authoring service 1005. Note that a sequence number is not included in this step (or its value is null).

Co-authoring service 1005 receives the package and compares the initial list of chunk identifiers provided by desktop application 1003 to its own list of chunk identifiers produced by hashing the chunks of hosted file 1007. The comparison results in a set of delta chunks in hosted file 1007 that differ relative to those of client file 1001. Accordingly, co-authoring service 1005 sends the delta chunks, its list of chunk identifiers, and its current sequence number (SN-k) to desktop application 1003.

Desktop application 1003 proceeds to update client file 1001 with the delta chunks provided by co-authoring service 1005. Desktop application 1003 also produces a new base description of client file 1001 by chunking and re-hashing the chunks of the file. At this point, the remainder of operational scenario 1000 is very similar to that of operational scenario 900.

Over time, local edits may be implemented in client file 1001 causing changes that need to be synced with hosted file 1007. To do so, desktop application 1003 again divides client file 1001 into chunks and hashes each chunk to generate an updated list of chunk identifiers. Desktop application 1003 also compares the updated list of chunk identifiers to the base list of chunk identifiers to determine which chunks of client file 1001 have changed since the file was last synchronized with hosted file 1007. Desktop application 1003 sends an update request to co-authoring service 1005 with the delta chunks resulting from the comparison, as well as a signature file that includes the updated list of chunk identifiers and the sequence number SN-k.

Co-authoring service 1005 receives the update package, including the signature file, and compares the sequence number provided in the signature file to its own current sequence number. If the sequence numbers match, then co-authoring service 1005 would update hosted file 1007 with the delta chunks provided by web-application 1003. However, if the sequence numbers do not match—which is assumed here for exemplary purposes—co-authoring service 1005 would reject the update attempt.

In response, desktop application 1003 requests an update from co-authoring service 1005 to obtain the delta chunks needed to bring client file 1001 up-to-date. However, this request includes information that reflects the most recent base state maintained by desktop application 1003. Co-authoring service 1005 replies with an update package of its own to bring client file 1001 in-sync with hosted file 1007. The update package sent to desktop application 1003 includes one or more delta chunks that represent the difference between the current state maintained by co-authoring service 1005 and the most recent base state maintained by desktop application 1003. The update package also includes a new list of chunk identifiers and a new (incremented) sequence number SN-k+1. Co-authoring service 1005 is able to determine which chunks to send as the new delta chunks by comparing the list of chunks in the signature file provided by desktop application 1003 as part of its update request.

Desktop application 1003 receives the update package from co-authoring service 1005 and updates client file 1001 with the delta chunks provided in the update. As mentioned above, this may be accomplished in a variety of ways, one example of which includes maintaining multiple versions of the file locally.

This may be accomplished in a variety of ways, one example of which includes maintaining multiple versions of the file locally and performing a multi-file merge. That is, desktop application 1003 may maintain a working copy of client file 1001, as well as a base copy of the file that represents client file 1001 in its base state. A download copy may also be maintained that represents the base copy plus the changes provided by co-authoring service 1005 in its update.

To bring the working copy of client file 1001 up-to-date, desktop application 1003 performs a three-way merge of the three files to produce an upload copy of client file 1001. Desktop application 1003 can then chunk and has the upload copy of client file 1001, as well as the download copy of the file. A comparison of the chunk IDs for the upload copy to chunk IDs for the download copy indicates to desktop application 1003 which chunks in the upload copy of client file 1001 are not possessed by hosted file 1007 and thus need to be uploaded.

Next, desktop application 1003 makes another attempt to update co-authoring service 1003. This time, the update package includes the new delta chunks, a new list of chunk identifiers, and the most recent sequence number provided by the service: SN-k+1. It is assumed for exemplary purposes that the sequence numbers match. Accordingly, co-authoring service 1005 updates hosted file 1007 with the delta chunks and replies to web application 1003 with the incremented sequence number: SN-k+2. Desktop application 1003 will then use the new sequence number the next time it attempts to send an update to co-authoring service 1005.

FIG. 11 illustrates computing device 1101 that is representative of any system or collection of systems in which the various processes, programs, services, and scenarios disclosed herein may be implemented. Examples of computing device 1101 include, but are not limited to, desktop and laptop computers, tablet computers, mobile computers, and wearable devices. Examples may also include server computers, web servers, cloud computing platforms, and data center equipment, as well as any other type of physical or virtual server machine, container, and any variation or combination thereof.

Computing device 1101 may be implemented as a single apparatus, system, or device or may be implemented in a distributed manner as multiple apparatuses, systems, or devices. Computing device 1101 includes, but is not limited to, processing system 1102, storage system 1103, software 1105, communication interface system 1107, and user interface system 1109 (optional). Processing system 1102 is operatively coupled with storage system 1103, communication interface system 1107, and user interface system 1109.

Processing system 1102 loads and executes software 1105 from storage system 1103. Software 1105 includes and implements process(es) 1106, which is (are) representative of the co-authoring and syncing processes discussed with respect to the preceding Figures, such as co-authoring process 200, co-authoring process 400, and syncing process 700. When executed by processing system 1102, software 1105 directs processing system 1102 to operate as described herein for at least the various processes, operational scenarios, and sequences discussed in the foregoing implementations. Computing device 1101 may optionally include additional devices, features, or functionality not discussed for purposes of brevity.

Referring still to FIG. 11, processing system 1102 may comprise a micro-processor and other circuitry that retrieves and executes software 1105 from storage system 1103. Processing system 1102 may be implemented within a single processing device but may also be distributed across multiple processing devices or sub-systems that cooperate in executing program instructions. Examples of processing system 1102 include general purpose central processing units, graphical processing units, application specific processors, and logic devices, as well as any other type of processing device, combinations, or variations thereof.

Storage system 1103 may comprise any computer readable storage media readable by processing system 1102 and capable of storing software 1105. Storage system 1103 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1103 may also include computer readable communication media over which at least some of software 1105 may be communicated internally or externally. Storage system 1103 may be implemented as a single storage device but may also be implemented across multiple storage devices or sub-systems co-located or distributed relative to each other. Storage system 1103 may comprise additional elements, such as a controller, capable of communicating with processing system 1102 or possibly other systems.

Software 1105 (including process(es) 1106) may be implemented in program instructions and among other functions may, when executed by processing system 1102, direct processing system 1102 to operate as described with respect to the various operational scenarios, sequences, and processes illustrated herein. For example, software 1105 may include program instructions for implementing a co-authoring process and/or sync process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1105 may include additional processes, programs, or components, such as operating system software, virtualization software, or other application software. Software 1105 may also comprise firmware or some other form of machine-readable processing instructions executable by processing system 1102.

In general, software 1105 may, when loaded into processing system 1102 and executed, transform a suitable apparatus, system, or device (of which computing device 1101 is representative) overall from a general-purpose computing system into a special-purpose computing system customized to perform co-authoring and file syncing in an optimized manner. Indeed, encoding software 1105 on storage system 1103 may transform the physical structure of storage system 1103. The specific transformation of the physical structure may depend on various factors in different implementations of this description. Examples of such factors may include, but are not limited to, the technology used to implement the storage media of storage system 1103 and whether the computer-storage media are characterized as primary or secondary storage, as well as other factors.

For example, if the computer readable storage media are implemented as semiconductor-based memory, software 1105 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1107 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 1101 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

It may be appreciated that, while the inventive concepts disclosed herein are discussed in the context of such productivity applications, they apply as well to other contexts such as gaming applications, virtual and augmented reality applications, business applications, and other types of software applications. Likewise, the concepts apply not just to electronic documents, but to other types of content such as in-game electronic content, virtual and augmented content, databases, and audio and video content.

Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A computing device comprising:
   one or more computer readable storage media;
   one or more processors operatively coupled to the one or more computer readable storage media; and
   an application comprising program instructions stored on the one or more computer readable storage media that, when executed by the one or more processors, direct the computing device to at least:
   receive a request to open a file, wherein a sync engine on the computing device synchronizes a local copy of the file with a hosted copy of the file hosted by a file service;
   in response to the request, open a temporary copy of the file on the computing device and populate the temporary copy of the file with content from the local copy of the file;
   establish a connection between the application and a co-authoring service that bypasses the sync engine;
   when connected to the co-authoring service over the connection, and when the temporary copy of the file is open on the computing device:
     receive user input via a user interface of the application comprising one or more edits to the content in the temporary copy of the file;
     edit the content in the temporary copy of the file based on the one or more edits; and
     synchronize the temporary copy of the file with the hosted copy of the file; and
   upon a file close event occurring, close the temporary copy of the file without synchronizing the local copy of the file with the temporary copy of the file, and without having synchronized the local copy of the file with the temporary copy of the file since having opened and populated the temporary copy of the file with the content.

2. The computing device of claim 1 wherein the program instructions further direct the computing device to at least:
   save the temporary copy of the file to a persistent storage location upon the file close event occurring while the application is disconnected from the co-authoring service; and
   open the temporary copy of the file from the persistent storage location upon an occurrence of a subsequent request to open the file.

3. The computing device of claim 2 wherein the program instructions further direct the computing device to delete the temporary copy of the file from system memory upon the file close event occurring while the application remains connected to the co-authoring service.

4. The computing device of claim 1 wherein, to synchronize the temporary copy of the file with the hosted copy of the file, the program instructions direct the computing device to:
   identify a base state of the temporary copy of the file, wherein the base state comprises a sequence number most recently provided by the co-authoring service to the application and a base list of chunk identifiers produced by hashing the temporary copy of the file on a per-chunk basis;
   after an amount of time during which one or more changes were made to the temporary copy of the file, determine an updated state of the temporary copy of the file, wherein the updated state comprises an updated list of chunk identifiers produced by re-hashing the temporary copy of the file on a per-chunk basis;
   identify one or more delta chunks by comparing the base list of chunk identifiers to the updated list of chunk identifiers to determine which chunks of the temporary copy of the file were altered by the one or more changes; and
   send an update to the co-authoring service comprising the updated list of chunk identifiers, the one or more delta chunks, and the sequence number.

5. The computing device of claim 4 wherein, to synchronize the temporary copy of the file with the hosted copy of the file, the program instructions further direct the computing device to, prior to identifying the base state of the temporary copy of the file:
   identify an initial state of the temporary copy of the file immediately upon populating the temporary copy of the file with the content from the local copy of the file, wherein the initial state comprises an initial list of chunk identifiers produced by hashing the temporary copy of the file on a per-chunk basis;
   send an initial synchronization request to the co-authoring service comprising the initial list of chunk identifiers;
   in reply to the initial synchronization request, receive from the co-authoring service an initial set of delta chunks, an initial set of chunk identifiers corresponding to the initial set of delta chunks, and the sequence number; and
   update the temporary copy of the file from the initial state to the base state based on at least the initial set of delta chunks.

6. The computing device of claim 5 wherein the initial set of delta chunks comprise one or more chunks of the hosted copy of the file that differ relative to any chunks of the temporary copy of the file in the initial state, as determined based on a comparison by the co-authoring service of the initial list of chunk identifiers to an authoritative list of chunk identifiers produced by the co-authoring service by hashing the hosted copy of the file on a per-chunk basis.

7. The computing device of claim 1 wherein, to open the temporary copy of the file on the computing device, the program instructions direct the computing device to open the temporary copy of the file immediately in the user interface to the application, and prior to synchronizing the content in the temporary copy of the file with the content in the hosted copy of the file.

8. One or more computer readable storage media having program instructions stored thereon that, when read and executed by one or more processors on a computing device, direct the computing device to at least:
  receive a request to open a file, wherein a sync engine on the computing device synchronizes a local copy of the file with a hosted copy of the file hosted by a file service;
  in response to the request, open a temporary copy of the file on the computing device and populate the temporary copy of the file with content from the local copy of the file;
  establish a connection between an application and a co-authoring service that bypasses the sync engine;
  when connected to the co-authoring service over the connection, and when the temporary copy of the file is open on the computing device;
    receive user input via a user interface of the computing device comprising one or more edits to the content in the temporary copy of the file;
    edit the content in the temporary copy of the file based on the one or more edits; and
    synchronize the temporary copy of the file with the hosted copy of the file; and
  upon a file close event occurring, close the temporary copy of the file without synchronizing the local copy of the file with the temporary copy of the file, and without having synchronized the local copy of the file with the temporary copy of the file since having opened and populated the temporary copy of the file with the content.

9. The one or more computer readable storage media of claim 8 wherein the program instructions further direct the computing device to at least:
  save the temporary copy of the file to a persistent storage location upon the file close event occurring while the application is disconnected from the co-authoring service; and
  open the temporary copy of the file from the persistent storage location upon an occurrence of a subsequent request to open the file.

10. The one or more computer readable storage media of claim 9 wherein the program instructions further direct the computing device to delete the temporary copy of the file from system memory upon the file close event occurring while the application remains connected to the co-authoring service.

11. The one or more computer readable storage media of claim 8 wherein, to synchronize the temporary copy of the file with the hosted copy of the file, the program instructions direct the computing device to:
  identify a base state of the temporary copy of the file, wherein the base state comprises a sequence number most recently provided by the co-authoring service to the application and a base list of chunk identifiers produced by hashing the temporary copy of the file on a per-chunk basis;
  after an amount of time during which one or more changes were made to the temporary copy of the file, determine an updated state of the temporary copy of the file, wherein the updated state comprises an updated list of chunk identifiers produced by re-hashing the temporary copy of the file on a per-chunk basis;
  identify one or more delta chunks by comparing the base list of chunk identifiers to the updated list of chunk identifiers to determine which chunks of the temporary copy of the file were altered by the one or more changes; and
  send an update to the co-authoring service comprising the updated list of chunk identifiers, the one or more delta chunks, and the sequence number.

12. The one or more computer readable storage media of claim 11 wherein, to synchronize the temporary copy of the file with the hosted copy of the file, the program instructions further direct the computing device to, prior to identifying the base state of the temporary copy of the file:
  identify an initial state of the temporary copy of the file immediately upon populating the temporary copy of the file with the content from the local copy of the file, wherein the initial state comprises an initial list of chunk identifiers produced by hashing the temporary copy of the file on a per-file basis;
  send an initial synchronization request to the co-authoring service comprising the initial list of chunk identifiers;
  in reply to the initial synchronization request, receive from the co-authoring service an initial set of delta chunks, an initial set of chunk identifiers corresponding to the initial set of delta chunks, and the sequence number; and
  update the temporary copy of the file from the initial state to the base state based on at least the initial set of delta chunks.

13. The one or more computer readable storage media of claim 12 wherein the initial set of delta chunks comprise one or more chunks of the hosted copy of the file that differ relative to any chunks of the temporary copy of the file in the initial state, as determined based on a comparison by the co-authoring service of the initial list of chunk identifiers to an authoritative list of chunk identifiers produced by the co-authoring service by hashing the hosted copy of the file on a per-chunk basis.

14. The one or more computer readable storage media of claim 8 wherein, to open the temporary copy of the file on the computing device, the program instructions direct the computing device to open the temporary copy of the file immediately in the user interface to the application, and prior to synchronizing the content in the temporary copy of the file with the content in the hosted copy of the file.

15. A method of synchronizing copies of a file, the method comprising:
  receiving a request to open the file on a computing device, wherein a sync engine on the computing device synchronizes a local copy of the file with a hosted copy of the file hosted by a file service;
  in response to the request, opening a temporary copy of the file on the computing device and populating the temporary copy of the file with content from the local copy of the file;
  establishing a connection between an application and a co-authoring service that bypasses the sync engine;
  when connected to the co-authoring service over the connection, and when the temporary copy of the file is open on the computing device:
    receiving user input comprising one or more edits to the content in the temporary copy of the file;
    editing the content in the temporary copy of the file based on the one or more edits; and
    synchronizing the temporary copy of the file with the hosted copy of the file; and
  upon a file close event occurring, closing the temporary copy of the file without synchronizing the local copy of the file with the temporary copy of the file and without having synchronized the local copy of the file with the temporary copy of the file since having opened and populated the temporary copy of the file with the content.

16. The method of claim 15, further comprising:
saving the temporary copy of the file to a persistent storage location upon the file close event occurring while the application is disconnected from the co-authoring service; and
opening the temporary copy of the file from the persistent storage location upon an occurrence of a subsequent request to open the file.

17. The method of claim 16, further comprising deleting the temporary copy of the file from system memory upon the file close event occurring while the application remains connected to the co-authoring service.

18. The method of claim 15, wherein synchronizing the temporary copy of the file with the hosted copy of the file comprises:
identifying a base state of the temporary copy of the file, wherein the base state comprises a sequence number most recently provided by the co-authoring service to the application and a base list of chunk identifiers produced by hashing the temporary copy of the file on a per-chunk basis;
after an amount of time during which one or more changes were made to the temporary copy of the file, determining an updated state of the temporary copy of the file, wherein the updated state comprises an updated list of chunk identifiers produced by re-hashing the temporary copy of the file on a per-chunk basis;
identifying one or more delta chunks by comparing the base list of chunk identifiers to the updated list of chunk identifiers to determine which chunks of the temporary copy of the file were altered by the one or more changes; and sending an update to the co-authoring service comprising the updated list of chunk identifiers, the one or more delta chunks, and the sequence number.

19. The method of claim 18, wherein synchronizing the temporary copy of the file with the hosted copy of the file further comprises, prior to identifying the base state of the temporary copy of the file:
identifying an initial state of the temporary copy of the file immediately upon populating the temporary copy of the file with the content from the local copy of the file, wherein the initial state comprises an initial list of chunk identifiers produced by hashing the temporary copy of the file on a per-file basis;
sending an initial synchronization request to the co-authoring service comprising the initial list of chunk identifiers;
in reply to the initial synchronization request, receiving from the co-authoring service an initial set of delta chunks, an initial set of chunk identifiers corresponding to the initial set of delta chunks, and the sequence number; and
updating the temporary copy of the file from the initial state to the base state based on at least the initial set of delta chunks.

20. The method of claim 19, wherein the initial set of delta chunks comprise one or more chunks of the hosted copy of the file that differ relative to any chunks of the temporary copy of the file in the initial state, as determined based on a comparison by the co-authoring service of the initial list of chunk identifiers to an authoritative list of chunk identifiers produced by the co-authoring service by hashing the hosted copy of the file on a per-chunk basis.

* * * * *